United States Patent
Lee et al.

(10) Patent No.: US 8,106,971 B2
(45) Date of Patent: Jan. 31, 2012

(54) APPARATUS AND METHOD FOR ESTIMATING SIGNAL-DEPENDENT NOISE IN A CAMERA MODULE

(75) Inventors: Min-Woo Lee, Suwon-si (KR); Sung-Dae Cho, Yongin-si (KR); Yun-Je Oh, Yongin-si (KR); Hyun-Hee Park, Seoul (KR); Min-Kyu Park, Seoul (KR); Ji-Hye Kim, Goyang-si (KR); Il-Kyu Eom, Pusan (KR); Hyun-Meen Kang, Pusan (KR)

(73) Assignees: Samsung Electronics Co., Ltd., Maetan-Dong, Yeongtong-Gu, Suwon-Si, Gyeonggi-Do (KR); Pusan National University Industry-University Cooperation Foundation, Geumjeong-Gu, Pusan (KR)

( * ) Notice: Subject to any disclaimer, the term of this patent is extended or adjusted under 35 U.S.C. 154(b) by 576 days.

(21) Appl. No.: 12/354,886

(22) Filed: Jan. 16, 2009

(65) Prior Publication Data

US 2009/0185057 A1    Jul. 23, 2009

(30) Foreign Application Priority Data

Jan. 17, 2008  (KR) .................. 10-2008-0005450

(51) Int. Cl.
  *H04N 5/217* (2006.01)
  *H04N 9/64* (2006.01)
(52) U.S. Cl. ........................................ 348/241; 348/250
(58) Field of Classification Search .................. 348/241, 348/250
  See application file for complete search history.

(56) References Cited

U.S. PATENT DOCUMENTS

2009/0040386 A1* 2/2009 Ishiga ........................... 348/607

* cited by examiner

*Primary Examiner* — William Choi
(74) *Attorney, Agent, or Firm* — Cha & Reiter, LLC

(57) ABSTRACT

A method and apparatus for estimating signal-dependent noise in a camera module are provided, in which an image is decomposed into high frequency components and low frequency components, a variance of noise in the image is estimated using the low frequency components, noise is eliminated from the high frequency components using the estimated noise variance, and the image is recovered using the noise-eliminated high frequency components and the low frequency components.

20 Claims, 6 Drawing Sheets

APPARATUS AND METHOD FOR ESTIMATING SIGNAL-DEPENDENT NOISE IN A CAMERA MODULE

CLAIM OF PRIORITY

This application claims the benefit of the earlier filing date, under 35 U.S.C. §119(a), to that Korean Patent Application filed in the Korean Intellectual Property Office on Jan. 17, 2008 and assigned Serial No. 10-2008-5450, the entire disclosure of which is hereby incorporated by reference.

BACKGROUND OF THE INVENTION

1. Field of the Invention

The present invention generally relates the field of signal-dependent noise estimation. More particularly, the present invention relates to an apparatus and method for estimating signal-dependent noise using wavelet coefficients of a low frequency band.

2. Description of the Related Art

Typically, noise is created in the process of image acquisition to image delivery to a final user due to many factors. The factors include the sensor features of a Charge Coupled Device (CCD), hardware features of a camera, and the characteristics of a transmission line. A noise-added image, which is a distortion of an original image, degrades image quality and decreases the performance of secondary image processing operations such as image improvement, information extraction, and object recognition. Noise cancellation from an image is essential to the field of image processing applications. Therefore, noise cancellation is one image processing field that has been studied for a long time and it is viewed as a necessary preliminary process for processing various images.

The most general model of image noise takes the form of a conventional image signal and independent noise added to it.

$$Y(i,j)=X(i,j)+\sigma\delta(i,j) \quad (1)$$

where (i,j) denotes coordinates in an image,
Y denotes a measured pixel value,
X denotes an original pixel value free of noise,
$\delta$ denotes a standard Gaussian random variable, and
$\sigma$ denotes the standard deviation of the standard Gaussian random variable.

Thus, the second term on the right side in equation (1) represents a noise component.

To cancel the independent noise from a conventional image signal as represented in equation (1), wavelet transform is usually adopted. The wavelet transform verified its usefulness in X-ray and magnetic resonance image processing in the medical field. A clear image without blurs in details can be obtained by the wavelet transform. A weak signal can be recovered from noise by use of the wavelet transform. The wavelet transform scheme is characterized in that it decreases wavelet coefficients including noise components sufficiently, while it decreases wavelet coefficients including signal components as little as possible or keeps them unchanged.

That is, noise cancellation in a wavelet area amounts to reduction of the magnitudes of wavelet coefficients contaminated with noise. A noise-added image is wavelet-transformed and the magnitudes of wavelet coefficients are adjusted or small wavelet coefficients are eliminated. Then inverse wavelet transform is performed, resulting in a cancellation of the noise component.

The standard deviation or variance of noise is the most significant part of wavelet transform-based noise cancellation. Since the variance of noise is not known beforehand in most cases, it should be estimated from an image having a noise component. To do so, a median noise estimator is used. The median noise estimator wavelet-transforms the image and then estimates the noise variance from the coefficients of the diagonal components in the highest frequency band.

Although the median noise estimator brings very accurate results for the signal and the independent noise expressed as equation (1), it has limitations in its effectiveness in estimating signal-dependent noise as observed in a camera module.

A more accurate noise model for an image obtained from Complementary Metal Oxide Semiconductor (CMOS) and CCD sensors in a camera module can be expressed as $$Y(i,j)=X(i,j)+(k_0+k_1 X(i,j))\delta(i,j) \quad (2)$$

where $k_0$ and $k_1$ are positive constants representing characteristics of a camera.

According to this model, the standard deviation of noise is larger in pixels with higher brightness values.

Equation (2) is referred to as a signal-dependent noise model in which the variance of noise is not independent of the signal X. In general, the CCD and CMOS sensors create noise due to light intensity or heat in view of their natures. This noise does not take Gaussian (or Laplacian) statistical characteristics and is dependent on the signal, compared to the general noise model. Hence, the noise of the sensors is not white and thus it is not easily eliminated by a general noise cancellation algorithm. Even though eliminated, the noise severely damages high frequency components of the signal.

As described above, the variance of the noise expressed as equation (2) is dependent on the original signal X. Even when the observed image is subject to wavelet transform, a part corresponding to the noise still has information about the original signal X. Thus, the value of the original signal X is required for estimating the noise variance and the noise cannot be estimated reliably with the median noise estimator.

SUMMARY OF THE INVENTION

Aspects of exemplary embodiments of the present invention is to provide an apparatus and method for estimating noise using information about a low-frequency wavelet subband in an image having signal-dependent noise.

In accordance with an aspect of exemplary embodiments of the present invention, there is provided a method for estimating signal-dependent noise in a camera module, in which an image is decomposed into high frequency components and low frequency components, a variance of noise in the image is estimated using the low frequency components, noise is eliminated from the high frequency components using the estimated noise variance, and the image is recovered using the noise-eliminated high frequency components and the low frequency components.

In accordance with another aspect of exemplary embodiments of the present invention, there is provided an apparatus for estimating signal-dependent noise in a camera module, in which a wavelet transformer decomposes an input image into high frequency components and low frequency components by wavelet transform, a noise estimator estimates noise using the low frequency components, a noise eliminator eliminates noise from the high frequency components using a noise variance received from the noise estimator, and an inverse wavelet transformer recovers the noise-eliminated high frequency components and the low frequency components to an original image.

BRIEF DESCRIPTION OF THE DRAWINGS

The above features and advantages of certain exemplary embodiments of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION OF THE INVENTION

The matters defined in the description such as a detailed construction and elements are provided to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

As described above, signal-dependent noise is generated in an image captured by a camera module with a CCD or CMOS sensor due to light intensity or heat in view of the nature of the camera module. Compared to signal-independent noise, the signal-dependent noise is not easily eliminated by a general noise cancellation algorithm as in a median noise estimator and even if eliminated, the signal-dependent noise does severe damage to high-frequency components of a signal, thereby impairing the original signal. Accordingly, the present invention provides a method for estimating signal-dependent noise using information about a low-frequency wavelet subband in a wavelet-transformed image.

Wavelet transform will first be described below.

Wavelet transform widely used for image compression is based on a set of filters having the coefficients of a discrete wavelet function. The basic operation of discrete wavelet transform applies to a discrete signal having n samples. The signal is divided into a low-frequency band and a high-frequency band by use of a pair of filters. Due to subsampling with a factor of 2, each band includes n/2 samples. Each row of the two-dimensional images is processed in a Low-Pass Filter (LPF) and a High-Pass Filter (HPF) and then down-sampled by a factor of 2, thus producing four subbands or sub-images LL, LH, HL and HH. The four sub-images are synthesized into an output image having as many samples as the original image. This wavelet transform process is illustrated in FIG. 1.

Figure 1:
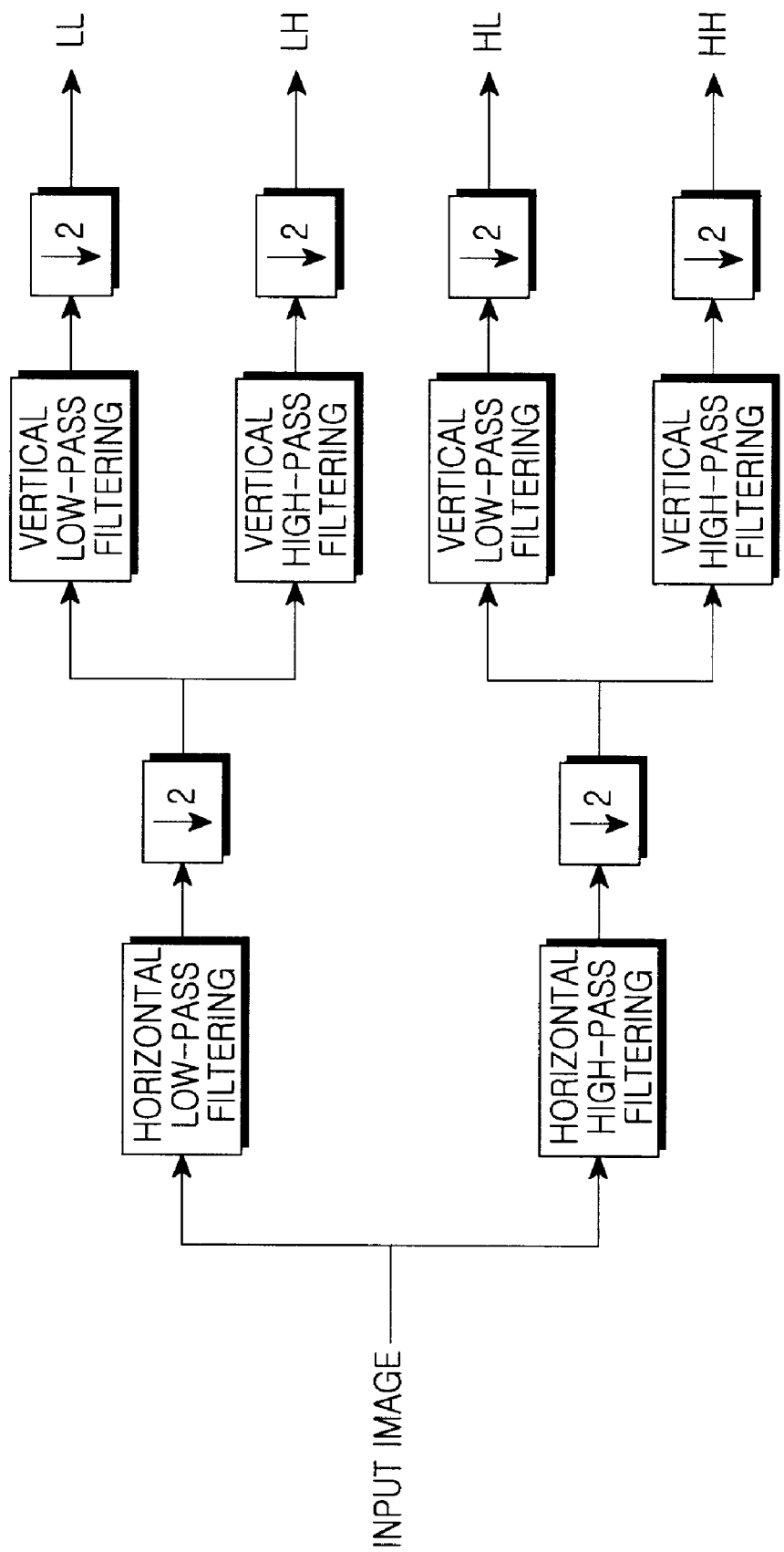
FIG. 1 illustrates wavelet transform of an input image to which the present invention is applied.

FIG. 1 illustrates wavelet transform of an input image to which the present invention is applied. The image is decomposed into four sub-images, each being a set of band-limited subband components by horizontal and vertical low-pass filtering and high-pass filtering.

The LL sub-image is the result of horizontal and vertical low-pass filtering of the original image. It preserves spatial low-frequency information but has lost high-frequency boundary information. The LL sub-image has a high energy concentration and significant information about the original image. The LH sub-image results from vertical high-pass filtering of the original image, containing vertical frequency error components. The HL sub-image is obtained by horizontal high-pass filtering of the original image, having horizontal frequency error components. The HH sub-image is the result of horizontal and vertical high-pass filtering of the original image. It indicates a diagonal boundary. The LH, HL and HH sub-images commonly have a low energy concentration and detailed information corresponding to the contour of an object.

Figure 2:
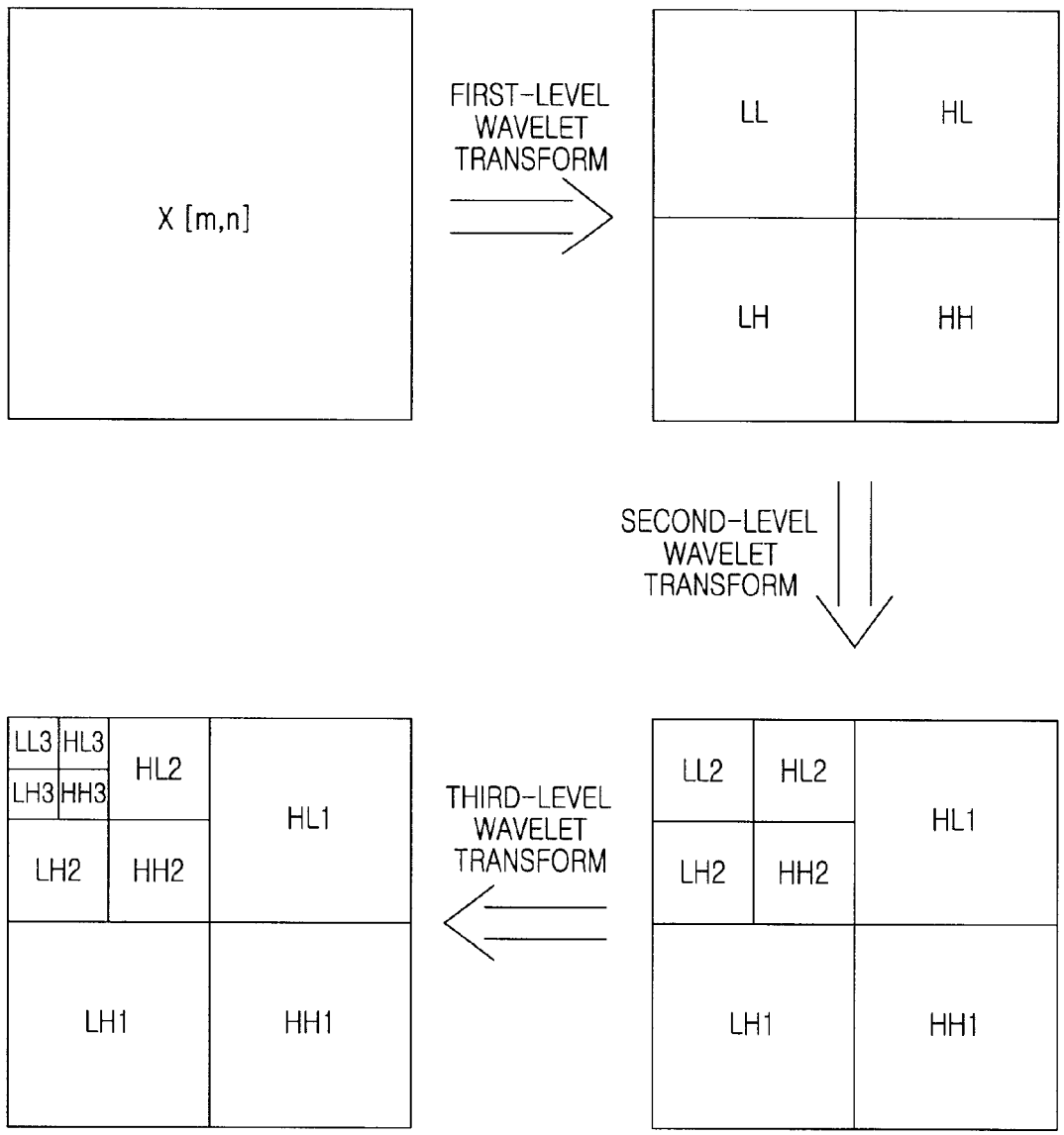
FIG. 2 illustrates multi-level wavelet transform to which the present invention is applied.

FIG. 2 illustrates multi-level wavelet transform to which the present invention is applied. Referring to FIG. 2, a first-level wavelet transform is performed. During a second-level wavelet transform, LL coefficients are wavelet-transformed in the resulting sub-images. Wavelet transform is then repeated using the resulting LL coefficients.

After noise of an image is estimated by wavelet transform, the original image is recovered by inverse wavelet transform, which will be described below.

Figure 3:
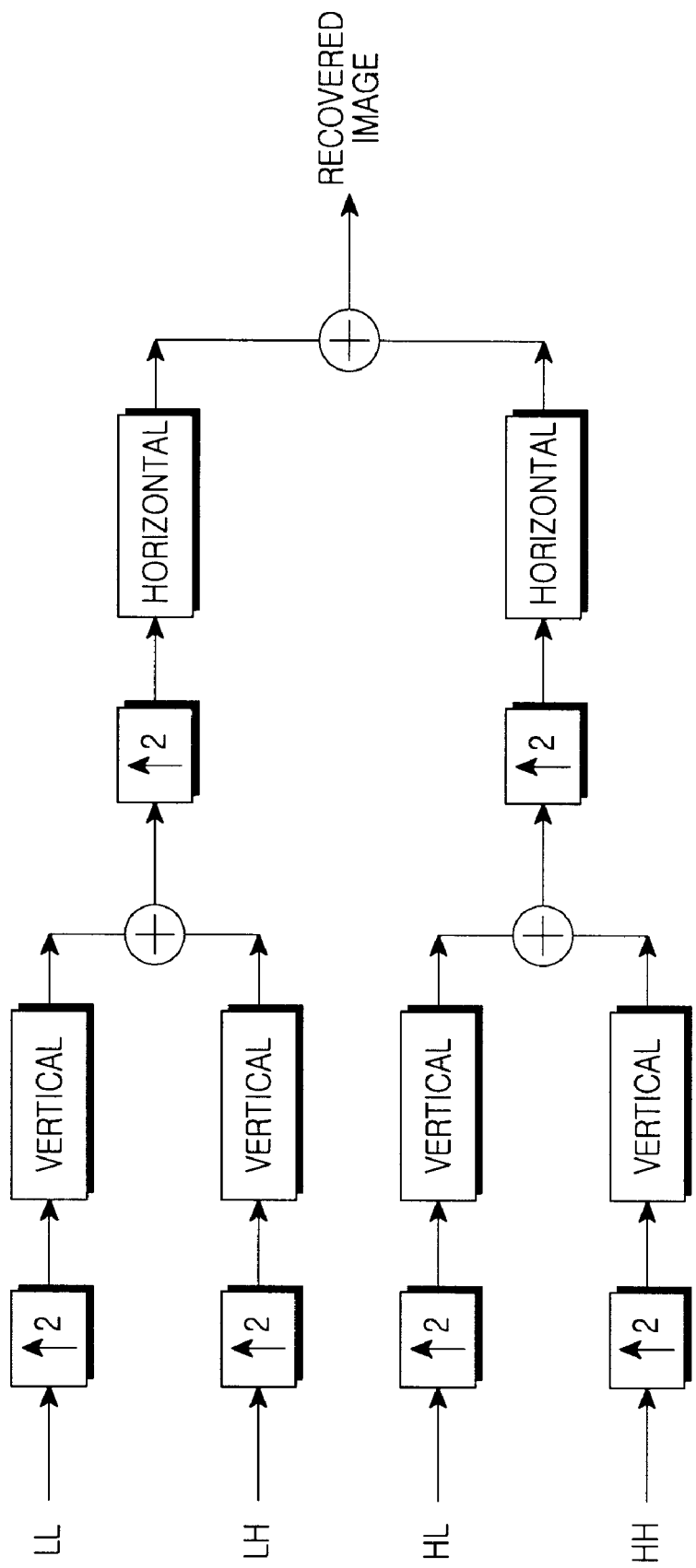
FIG. 3 illustrates inverse wavelet transform of four sub-images to which the present invention is applied.

FIG. 3 illustrates inverse wavelet transform of four sub-images to which the present invention is applied. Referring to FIG. 3, the four sub-images are up-sampled vertically and then up-sampled horizontally, thus recovering an image.

An overall configuration of the present invention using the wavelet transform will be described with reference to FIG. 4.

Figure 4:
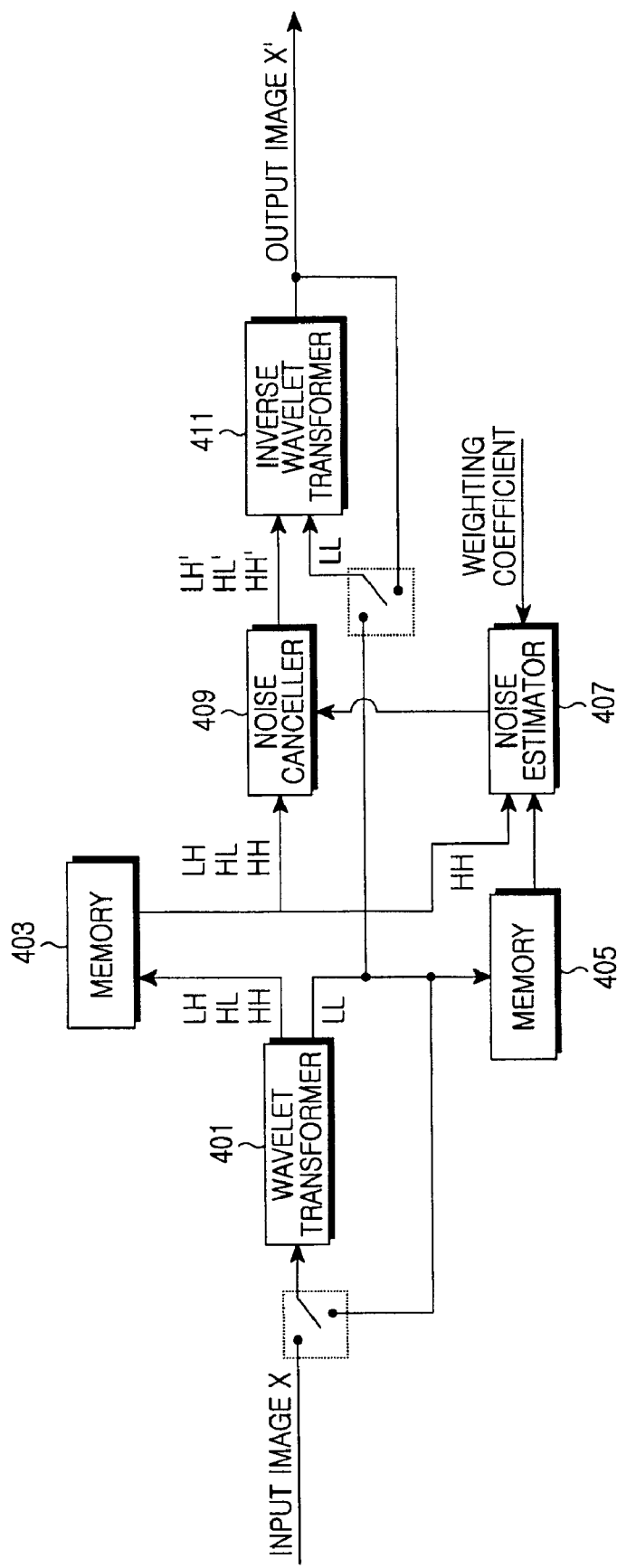
FIG. 4 is a block diagram of a signal-dependent noise estimation apparatus according to an exemplary embodiment of the present invention.

FIG. 4 is a block diagram of a signal-dependent noise estimation apparatus according to an exemplary embodiment of the present invention.

Referring to FIG. 4, the signal-dependent noise estimation apparatus includes a wavelet transformer 401, memories 403 and 405 for storing output components, a noise estimator 407 for estimating a noise component, a noise canceller 409 for canceling noise, and an inverse wavelet transformer 411 for performing inverse wavelet transform.

In operation, the wavelet transformer 401 performs an initial wavelet transform on an input image and repeats the wavelet transform on the low-frequency component output LL of the previous wavelet transform result, starting from a second wavelet transform.

The memory 403 is a Last In First Out (LIFO) memory and stores the high-frequency component outputs of the wavelet transformer 403. The memory 405 stores the low-frequency component output of the wavelet transformer 401.

The noise estimator 407 estimates noise, including a median noise estimator for estimating noise from diagonal high-frequency components HH and a noise variance from the LL components.

The noise canceller 409 eliminates noise using the high-frequency components received from the LIFO memory 403 that stores the high-frequency component outputs and a variance of noise received from the noise estimator 407. The inverse wavelet transformer 411 produces an initial output image by performing inverse wavelet transform on a noise-free high frequency component and a low-frequency component generated from the last wavelet transform repetition of the wavelet transformer 401 and then repeats the inverse wavelet transform on the output image and a next high-frequency component received from the noise canceller 409.

The above wavelet transform operation will be described with reference to FIG. 4.

All components illustrated in FIG. 4 operate in an order set by a control processor. The wavelet transformer 401 receives an input image, decomposes it into high-frequency components LH, HL and HH and low-frequency components LL, and stores them in the memories 403 and 405, respectively.

After the input image is provided to the wavelet transformer 401, an input selector is connected to the memory 405 so that the low-frequency components LL output from the wavelet transformer 401 are used as an input image for the next-level wavelet transform. The wavelet transformer 401 performs the wavelet transform operation as many times as an intended number.

The memory 403 stores the high-frequency components HH, HL and LH received from the wavelet transformer 401. The memory 403 is a LIFO type and thus outputs the high-frequency components in a reverse order of entry. On the other hand, the memory 405 stores the low-frequency components LL received from the wavelet transformer 401. Depending on a noise estimation method used, low-frequency values stored in the memory 405 can be continuously used without being deleted, or only the low-frequency values obtained from the last wavelet transform can be used.

The noise canceller 409 receives the high-frequency components with noise, LH, HL and HH, and cancels noise from the high-frequency components LH, HL and HH using an estimated noise variance received from the noise estimator 407. Thus noise-free high-frequency components LH', HL' and HH' are output. Any noise cancellation method using a noise variance is available in the noise canceller 409.

Figure 5:
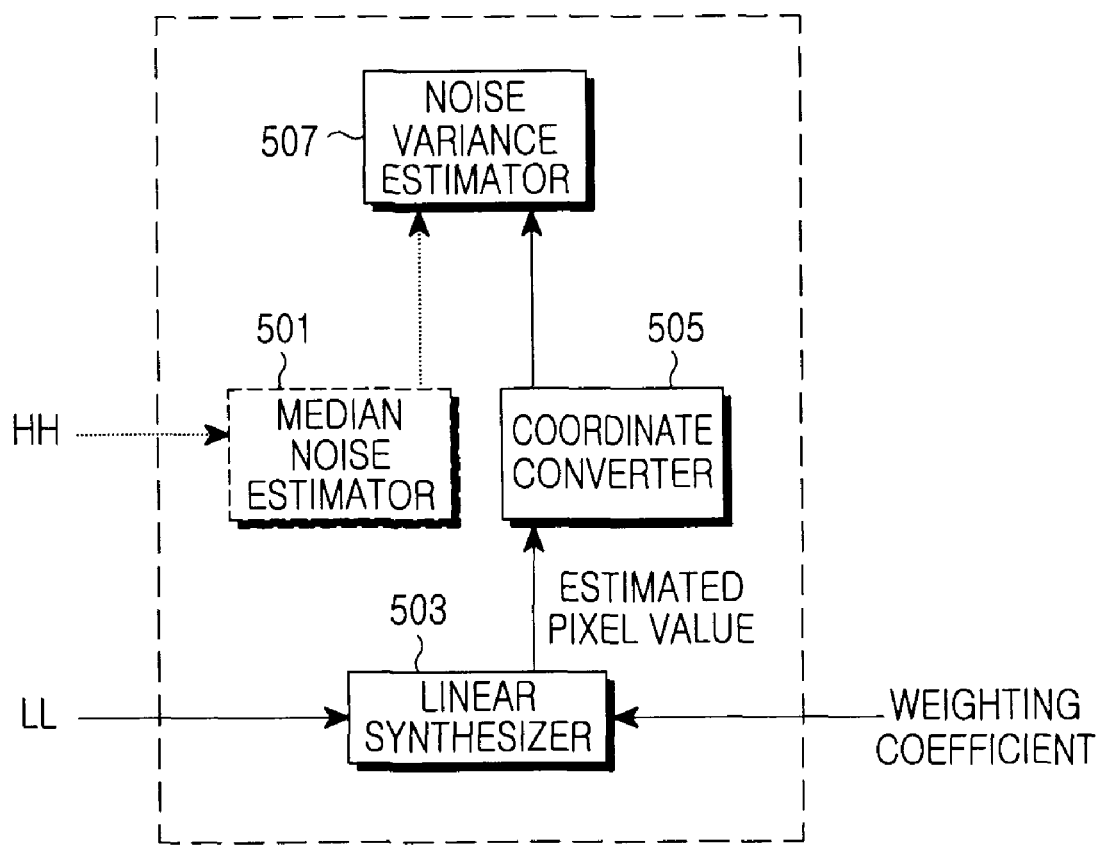
FIG. 5 is a block diagram of a noise estimator according to an exemplary embodiment of the present invention.

FIG. 5 is a block diagram of the noise estimator 407 according to an exemplary embodiment of the present invention.

Referring to FIG. 5, the noise estimator 407 includes a linear synthesizer 503 for further eliminating noise from LL coefficients by weighted-averaging of LL coefficients, a coordinate converter 505 for calculating the coordinates of a low-frequency component, a median noise estimator 501 for estimating noise by a median noise estimation method, and a noise variance estimator 507 for estimating the variance of signal-dependent noise.

The linear synthesizer 503 is used for further eliminating noise from LL coefficients by weighted-averaging the LL coefficients. LL information from a first-level wavelet transform and LL information from a second-or more level wavelet transform can be used in various ways. The LL information from the first-level wavelet transform is beneficial in terms of resolution but is not cost-effective in terms of memory capacity and computation volume. However, LL information from the last-level wavelet transform suffers from low resolution but has the advantages of a minimum memory capacity requirement and a minimum volume of computation. The linear synthesizer 503 can estimate a value of an original image from which a noise variance is estimated.

The coordinate converter 505 calculates the coordinates of a low-frequency component in terms of a position in a high-frequency wavelet image because the coordinates of LL coefficients may not match those of other coefficients according to the number of wavelet transform levels. The median noise estimator 501 estimates noise using HH coefficients of a wavelet high-frequency subband. The noise variance estimator 507 estimates the variance of signal-dependent noise from the output of the median noise estimator 501 and the coordinate-converted output of the linear synthesizer 503.

The standard deviation or variance of noise is estimated as follows using the noise estimator having the above configuration.

The linear synthesizer 503 weighted-averages LL coefficients obtained from a predetermined-level wavelet transform for further elimination of noise from the LL coefficients as:

$$\tilde{X}(i_{LL}, j_{LL}) = \sum_{m=m1}^{m2} \sum_{n=n1}^{n2} w_k(m, n) X_{LL}(i_{LL} + m, j_{LL} + n) \quad (3)$$

where $\tilde{X}(i_{LL}, j_{LL})$ denotes the weighted-averaged value,
w denotes a weighting coefficient that can be an externally received fixed value or a dynamic value that varies according to an adaptive algorithm.

In one aspect of the invention, if $m1=n1=-1$ and $m2=n2=1$, the range of the weighting coefficient being a non-zero values takes the form of a 3×3 mask. If LL coefficients resulting from the last-level wavelet transform are used, they have little noise. Hence, the variables are set so that $m1=n1=m1=n2=1$ and $w=1$. The above cases are used depending on user needs.

Then, the coordinate converter 505 converts the coordinates of $\tilde{X}(i_{LL}, j_{LL})$ to those of $\tilde{X}(i,j)$ corresponding to a high-frequency subband coefficient from which noise should be eliminated.

If $k_0$ and $k_1$, which are positive constants denoting the parameters of the camera or characteristics of the camera, are known, the estimated noise variance is computed using equation (2) and equation (4) as $$\hat{\sigma}(i,j) = k_0 + k_1 \hat{X}(i,j). \quad (4)$$

If $k_0$ and $k_1$ are not known, the estimated noise variance is computed using equation (5) by $$\hat{\sigma}(i,j) = k'_0 + k'_1 \hat{X}(i,j) \quad (5)$$

where $k'_0$ denotes the standard deviation of noise estimated by the median noise estimator 502.

The noise estimator 407 provides the standard deviation or variance of noise estimated by equation (4) or equation (5) to the noise eliminator 109, for noise cancellation.

After the noise cancellation, the inverse wavelet transformer 411 creates an initial output image by performing inverse wavelet transform on noise-canceled high-frequency components and the low-frequency components LL generated during the last-level wavelet transform of the wavelet transformer 401. Then, the inverse wavelet transformer 411 repeats the inverse wavelet transform on the output image and next high-frequency components received from the noise eliminator 409, thereby recovering the original image.

During the inverse wavelet transform of the four sub-images, they are upsampled vertically and then horizontally. Thus, the original image is recovered.

Figure 6:
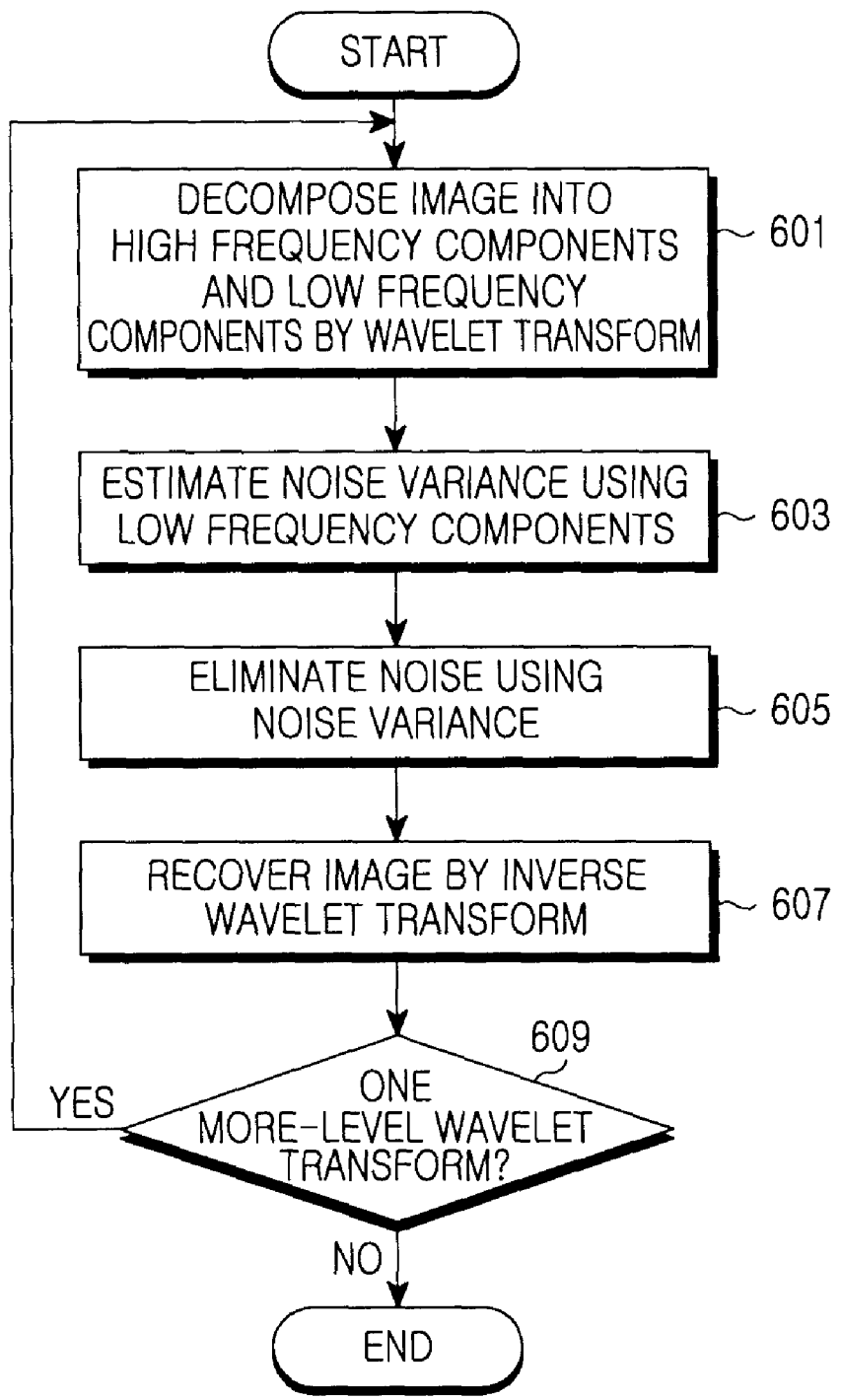
FIG. 6 is a flowchart illustrating a noise estimation operation according to an exemplary embodiment of the present invention.

FIG. 6 is a flowchart illustrating a noise estimation operation according to an exemplary embodiment of the present invention.

Referring to FIG. 6, an input image is decomposed into high-frequency components and low-frequency components by wavelet transform and stored in the memories in step 601. In step 603, the variance of noise is estimated using the stored low-frequency components. Then noise is canceled from the high frequency components using the noise variance estimate in step 605. The original image is recovered using noise-cancelled components in step 607 and the wavelet transform may continue according to the number of user-set wavelet transform levels. If the wavelet transform is added, a stored low-frequency component is decomposed further into high-frequency components and low-frequency components by wavelet transform. If there is no more wavelet transform repetition, the procedure ends.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be rendered in such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

As is apparent from the above description, the present invention enables estimation of signal-dependent noise in an image using low-frequency components. For an already wavelet-transformed image, noise can be estimated immediately using information about a low frequency band.

While the invention has been shown and described with reference to certain exemplary embodiments of the present invention thereof, it will be understood by those skilled in the art that various changes in form and details may be made therein without departing from the spirit and scope of the present invention as defined by the appended claims and their equivalents.

What is claimed is:

1. A method for estimating signal-dependent noise in a camera module, comprising:
   decomposing an image into high frequency components and low frequency components;
   estimating a variance of noise in the image using the low frequency components;
   eliminating noise from the high frequency components using the estimated noise variance; and
   recovering the image using the noise-eliminated high frequency components and the low frequency components.

2. The method of claim 1, wherein the decomposition comprises decomposing the image into the high frequency components and the low frequency components by wavelet transform.

3. The method of claim 1, wherein the noise variance estimation comprises estimating the noise variance using low frequency components obtained from one or more wavelet transform levels.

4. The method of claim 1, wherein the noise variance estimation comprises weighted-averaging the low frequency components and eliminating noise from the low frequency components according to the following equation, $$\tilde{X}(i_{LL}, j_{LL}) = \sum_{m=m1}^{m2} \sum_{n=n1}^{n2} w_k(m, n) X_{LL}(i_{LL} + m, j_{LL} + n)$$

where w denotes a weighting coefficient that is one of an externally received fixed value and a dynamic value varying according to an adaptive algorithm.

5. The method of claim 1, wherein the noise variance estimation comprises estimating the noise variance, if parameters of a camera are known, according to the following equation, $$\hat{\sigma}(i,j) = k_0 + k_1 \hat{X}(i,j)$$

where $k_0$ and $k_1$ are positive constants denoting the parameters of the camera or characteristics of the camera.

6. The method of claim 5, wherein the noise variance estimation further comprises estimating the noise variance, if the parameters of the camera are not known, according to the following equation, $$\hat{\sigma}(i,j) = k'_0 + k'_1 \hat{X}(i,j)$$

where $k'_0$ denotes a camera parameter value estimated by a median noise estimator.

7. The method of claim 1, wherein the image recovery comprises recovering the image by inverse wavelet transform.

8. An apparatus for estimating signal-dependent noise in a camera module, comprising:
   a wavelet transformer for decomposing an input image into high frequency components and low frequency components by wavelet transform;
   a noise estimator for estimating noise variance using the low frequency components;
   a noise eliminator for eliminating noise from the high frequency components using the noise variance received from the noise estimator; and
   an inverse wavelet transformer for recovering the noise-eliminated high frequency components and the low frequency components to an original image.

9. The apparatus of claim 8, wherein the noise estimator comprises:
   a median noise estimator for estimating noise using the high frequency components;
   a linear synthesizer for eliminating noise by weighted-averaging the low frequency components;
   a coordinate converter for calculating coordinates of a low frequency component corresponding to a high frequency component from which noise is to be eliminated; and
   a noise variance estimator for estimating a variance of signal-dependent noise using the low frequency component.

10. The apparatus of claim 9, wherein the median noise estimator is selectively used depending on the presence or absence of a parameter value of a camera.

11. The apparatus of claim 9, wherein the linear synthesizer weighted-averages low frequency components received from a memory using an externally received weighting coefficient.

12. The apparatus of claim 11, wherein said high frequency components are stored in a first memory and said low frequency components are stored in a second memory.

13. The apparatus of claim 12, wherein said first memory is a LIFO memory.

14. The device of claim 13, wherein the noise variance estimation comprises estimating the noise variance, if parameters of a camera are known, according to the following equation, $$\hat{\sigma}(i,j) = k_0 + k_1 \hat{X}(i,j)$$

where $k_0$ and $k_1$ are positive constants denoting the parameters of the camera or characteristics of the camera.

15. The device of claim 13, wherein the noise variance estimation further comprises estimating the noise variance, if the parameters of the camera are not known, according to the following equation, $$\hat{\sigma}(i,j) = k'_0 + k'_1 \hat{X}(i,j)$$

where $k'_0$ denotes a camera parameter value estimated by a median noise estimator.

16. A device for estimating signal-dependent noise in a camera module, comprising:
  a processor in communication with a memory, the memory including code which when accessed by the processor causes the processor to:
    decompose an image into high frequency components and low frequency components;
    estimate a variance of noise in the image using the low frequency components;
    eliminate noise from the high frequency components using the estimated noise variance; and
    recover the image using the noise-eliminated high frequency components and the low frequency components.

17. The device of claim 16, wherein the processor decomposes the image into the high frequency components and the low frequency components by wavelet transform.

18. The device of claim 16, wherein the processor estimates the noise variance using low frequency components obtained from one or more wavelet transform levels.

19. The device of claim 16, wherein the noise variance estimation comprises weighted-averaging the low frequency components and eliminating noise from the low frequency components according to the following equation, $$\tilde{X}(i_{LL}, j_{LL}) = \sum_{m=m1}^{m2} \sum_{n=n1}^{n2} w_k(m, n) X_{LL}(i_{LL} + m, j_{LL} + n)$$

where w denotes a weighting coefficient that is one of an externally received fixed value and a dynamic value varying according to an adaptive algorithm.

20. The device of claim 16, wherein the image recovery comprises recovering the image by inverse wavelet transform.

* * * * *